United States Patent
Kanagovi et al.

(10) Patent No.: US 11,842,299 B2
(45) Date of Patent: Dec. 12, 2023

(54) SYSTEM AND METHOD USING DEEP LEARNING MACHINE VISION TO CONDUCT PRODUCT POSITIONING ANALYSES

(71) Applicant: Dell Products L.P., Round Rock, TX (US)

(72) Inventors: Ramakanth Kanagovi, Bangalore (IN); Ravi Shukla, Bangalore (IN); Prakash Sridharan, Bangalore (IN); Arun Swamy, Bangalore (IN); Sumant Sahoo, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 388 days.

(21) Appl. No.: 16/741,948

(22) Filed: Jan. 14, 2020

(65) Prior Publication Data
US 2021/0217033 A1  Jul. 15, 2021

(51) Int. Cl.
*G06Q 30/0204* (2023.01)
*G06N 3/04* (2023.01)
(Continued)

(52) U.S. Cl.
CPC ......... *G06Q 30/0205* (2013.01); *G06F 18/22* (2023.01); *G06N 3/04* (2013.01); *G06N 3/08* (2013.01); *G06V 10/762* (2022.01); *G06V 10/764* (2022.01); *G06V 10/82* (2022.01); *G06V 30/147* (2022.01); *G06V 30/19173* (2022.01); *G06V 30/422* (2022.01); *G06V 30/10* (2022.01)

(58) Field of Classification Search
CPC ............. G06Q 30/0205; G06V 30/422; G06K 9/6215; G06N 3/04; G06N 3/08
USPC .......................................................... 705/7.31
See application file for complete search history.

(56) References Cited

U.S. PATENT DOCUMENTS 10,198,635 B2 * 2/2019 Chen ................. G06Q 30/0282
10,621,203 B2 * 4/2020 Hunt ...................... G06F 16/283
(Continued)

OTHER PUBLICATIONS

Malik Khizar Hayat "Towards Deep Learning Prospects: Insights for Social Media Analytics" accepted Mar. 6, 2019, date of current version Apr. 3, 2019. IEEE (Year: 2019).*

(Continued)

*Primary Examiner* — Abdallah A El-Hage Hassan
(74) *Attorney, Agent, or Firm* — Terrile, Cannatti & Chambers; Stephen A. Terrile

(57) ABSTRACT

At least one embodiment is directed to a computer-implemented method for using machine vision to categorize a locality to conduct product positioning analyses, the method including: generating locality profile scores for each locality of a plurality of localities using deep learning networks, where the locality profile score includes distributions of entity classes within the locality; extracting a set of entities having the same entity class from a group of localities; retrieving historical purchasing data for the entity set; and generating a sequence of products likely to be purchased by a target entity as a function of: the similarity of purchasing characteristics of the target entity with respect to other entities, product sequences found in product purchase of other entities, and entity profile weights extracted from the locality profile scores of other entities that have purchased one or more of the same products as the target entity.

14 Claims, 16 Drawing Sheets

(51) Int. Cl.
*G06N 3/08* (2023.01)
*G06V 30/422* (2022.01)
*G06F 18/22* (2023.01)
*G06V 30/146* (2022.01)
*G06V 30/19* (2022.01)
*G06V 10/762* (2022.01)
*G06V 10/764* (2022.01)
*G06V 10/82* (2022.01)
*G06V 30/10* (2022.01)

(56) References Cited

U.S. PATENT DOCUMENTS

| | | | |
|---|---|---|---|
| 11,409,826 B2* | 8/2022 | Sridharan | G06Q 30/0201 |
| 2006/0074707 A1* | 4/2006 | Schuette | G06Q 10/087 |
| | | | 705/28 |
| 2009/0006151 A1 | 1/2009 | Zarghami et al. | |
| 2014/0156347 A1* | 6/2014 | Agrawal | G06Q 30/0202 |
| | | | 705/7.31 |
| 2015/0348094 A1 | 12/2015 | Ferber et al. | |
| 2017/0109615 A1* | 4/2017 | Yatziv | G06F 18/24323 |
| 2017/0278289 A1* | 9/2017 | Marino | G06T 7/536 |
| 2018/0082237 A1* | 3/2018 | Nagel | G06F 16/258 |
| 2019/0012683 A1* | 1/2019 | Jang | G06Q 30/0256 |
| 2020/0380540 A1* | 12/2020 | Fox | G06N 20/00 |

OTHER PUBLICATIONS

Benjamin Letham et al., Sequential event prediction, Machine Learning 93:357-380, 2013 http://lethalletham.com/Letham_SEP_final.pdf.

Yanpeng Zhao et al., Sequence Prediction Using Neural Network Classifiers, JMLR: Workshop and Conference Proceedings 57:164,169, The Sequence PredictIction ChallengE (SPiCe), 2016 http://proceedings.mlr.press/v57/zhao16.pdf.

* cited by examiner

SYSTEM AND METHOD USING DEEP LEARNING MACHINE VISION TO CONDUCT PRODUCT POSITIONING ANALYSES

BACKGROUND OF THE INVENTION

Field of the Disclosure

The present disclosure relates to information handling systems. More specifically, embodiments of the disclosure relate to a system and method using deep learning machine vision to categorize localities to conduct product positioning analyses.

Description of the Related Art

As the value and use of information continues to increase, individuals and businesses seek additional ways to process and store information. Options available to users include information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as customer record management, business projection analysis, etc. In addition, information handling systems may include a variety of hardware and software components that are configured to process, store, and communicate information and may include one or more computer systems, data storage systems, and networking systems.

SUMMARY

A system of one or more computers can be configured to perform particular operations or actions by virtue of having software, firmware, hardware, or a combination of them installed on the system that in operation causes or cause the system to conduct product positioning analyses using data provided by deep learning machine vision operations. At least one embodiment is directed to a computer-implemented method for using machine vision to categorize a locality to conduct product positioning analyses, the method including: generating locality profile scores for each locality of a plurality of localities, where the locality profile score includes distributions of entity classes within the locality, the locality profile score for each locality being derived through neural network analyses of map images of the locality; extracting a set of entities having the same entity class from a group of localities; retrieving historical purchasing data for the set of entities for products purchased over a predetermined period of time; determining similarity of purchasing characteristics for a target entity in the set of entities with respect to other entities in the set of entities; and generating a sequence of products likely to be purchased by the target entity as a function of: similarity of purchasing characteristics of the target entity with respect to other entities in the set of entities, product sequences found in product purchase histories in the historical purchasing data of other entities in the set of entities, and entity profile weights extracted from the locality profile scores of other entities in the set of entities that have purchased one or more of the same products as the target entity. Other embodiments of this aspect include corresponding computer systems, apparatus, and computer programs recorded on one or more computer storage devices, each configured to perform the actions of the methods.

At least one embodiment is directed to a system including: a processor; a data bus coupled to the processor; and a non-transitory, computer-readable storage medium embodying computer program code, the non-transitory, computer-readable storage medium being coupled to the data bus, the computer program code interacting with a plurality of computer operations and may include instructions executable by the processor and configured for: generating locality profile scores for each locality of a plurality of localities, where the locality profile score includes distributions of entity classes within the locality, the locality profile score for each locality being derived through neural network analyses of map images of the locality; extracting a set of entities having the same entity class from a group of localities; retrieving historical purchasing data for the set of entities for products purchased over a predetermined period of time; determining similarity of purchasing characteristics for a target entity in the set of entities with respect to other entities in the set of entities; and generating a sequence of products likely to be purchased by the target entity as a function of: similarity of purchasing characteristics of the target entity with respect to other entities in the set of entities, product sequences found in product purchase histories in the historical purchasing data of other entities in the set of entities, and entity profile weights extracted from the locality profile scores of other entities in the set of entities that have purchased one or more of the same products as the target entity.

At least one embodiment is directed to a non-transitory, computer-readable storage medium embodying computer program code, the computer program code may include computer executable instructions configured for: generating locality profile scores for each locality of a plurality of localities, where the locality profile score includes distributions of entity classes within the locality, the locality profile score for each locality being derived through neural network analyses of map images of the locality; extracting a set of entities having the same entity class from a group of localities; retrieving historical purchasing data for the set of entities for products purchased over a predetermined period of time; determining similarity of purchasing characteristics for a target entity in the set of entities with respect to other entities in the set of entities; and generating a sequence of products likely to be purchased by the target entity as a function of: similarity of purchasing characteristics of the target entity with respect to other entities in the set of entities, product sequences found in product purchase histories in the historical purchasing data of other entities in the set of entities, and entity profile weights extracted from the locality profile scores of other entities in the set of entities that have purchased one or more of the same products as the target entity.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
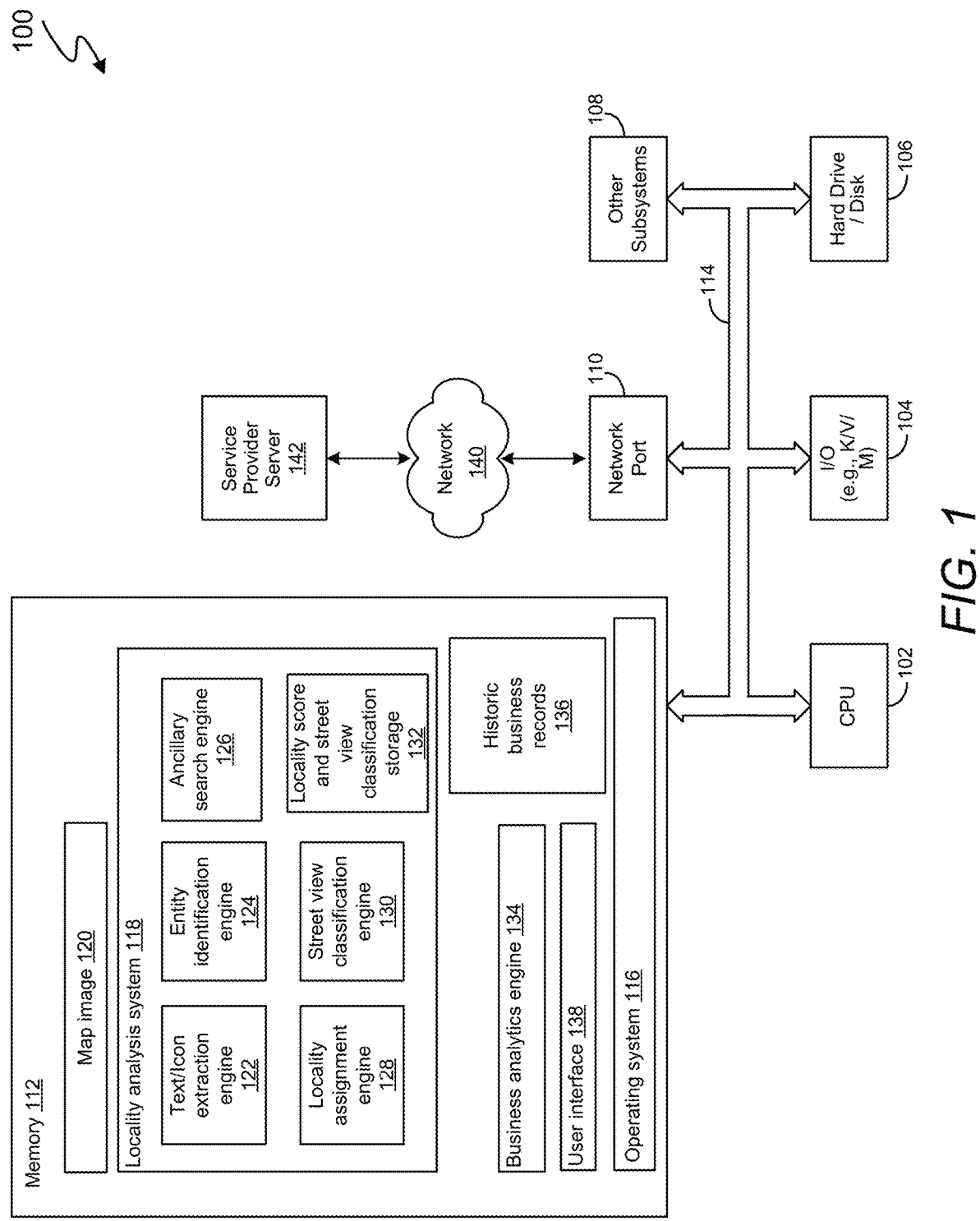
FIG. 1 is a generalized illustration of an information handling system that is configured to implement certain embodiments of the system and method of the present disclosure.

Systems and methods are disclosed for employing deep learning machine vision analysis on geographic artefacts found in map images for various localities in order to collect and interpret customer ecosystem data that translates into meaningful and actionable insights that may be used by an enterprise to increase account retention, induce account spending, identify whitespace accounts, mine leads, and position products for existing greenfield accounts. In certain embodiments, the neural networks are used to identify geographic artefacts (e.g., Text/Icons/Visual Cues) present in a map for a locality. In certain embodiments, the geographic artifacts correspond to entities existing within a boundary of the locality. In certain embodiments, the entities may be assigned different entity types to determine a locality profile score based on the types of entities in the locality. In certain embodiments, street view images associated with the entities within the locality are accessed and provided to a deep learning network to obtain further insights for the entity, locality, and/or economic characterization of the locality/entity. For purposes of the present disclosure, a street view image of an entity includes any image from which an external view of the building or area associated with the entity may be extracted. Embodiments of the disclosed system include identifying a sequence of products likely to be purchased by a target entity (e.g., the entity for which the predictions are to be made) as a function of the similarity of purchasing characteristics of the target entity with respect to other entities in a set of entities, product sequences found in product purchase histories in the historical purchasing data of other entities in the set of entities, and the entity profile weights extracted from the locality profile scores of other entities in the set of entities that have purchased one or more of the same products as the target entity.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that is configured to implement certain embodiments of the system and method of the present disclosure. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is accessible by a service provider server 142. In certain embodiments, a user interacts with the various components and engines of the information handling system 100 through a user interface 138.

The information handling system 100 likewise includes system memory 112, which is interconnected to the foregoing via one or more buses 114. System memory 112 may be local memory, remote memory, memory distributed between multiple information handling systems, etc. System memory 112 further comprises an operating system 116 and in various embodiments may also comprise other software modules and engines configured to implement certain embodiments of the disclosed system.

In the example shown in FIG. 1, memory 112 includes a locality analysis system 118 that is configured to generate a locality profile score for a locality defined by a map image 120 and, in some embodiments, add further classifications to entities in the locality based on images of the buildings or areas associated with the entities may be extracted. The boundaries defining the locality of map image 120 may be entered directly by a user. Additionally, or in the alternative, the boundaries used to define various localities may be based on business sector, business region, product sector, etc. In certain embodiments, the map image 120 may include boundaries for multiple, separate localities that are analyzed as different localities by the locality analysis system 118. In certain embodiments, the map image 120 may be limited to a map image of a single locality that is to be analyzed by the locality analysis system 118.

The exemplary locality analysis system 118 shown in FIG. 1 includes a text/icon extraction engine 122. In at least one embodiment, the text/icon extraction engine 122 includes a convolutional neural network (CNN) that consumes segmented pixel areas (e.g., 15 by 15 pixel areas) of the map image 120 and distinguishes areas containing text and/or icons from areas that do not contain text and/or icons. In at least one embodiment, the text and/or icon pixel areas are used to reconstruct a map image that generally includes only the text and/or icon pixel areas. The same CNN or another CNN of the text/icon extraction engine 122 performs an optical character recognition (OCR) operation on the reconstructed map image. In certain embodiments, the OCR text is provided to an entity identification engine 124, which assists in identifying the type of entity associated with the OCR text. In certain embodiments, the type of entity may be directly derived from the text associated with the entity. As an example, an entity described as "Phoenix Movie Theater" in the OCR text may be properly determined to be a movie theater type entity. In certain embodiments, the type of entity may be derived from an icon associated with the text of the entity. As an example, an entity described as "Phoenix" in the OCR text and having a movie theater icon in close proximity to the text may be properly classified as a movie theater type entity.

In at least one embodiment, OCR text is used to search ancillary sources to identify the entities within the locality. To this end, certain embodiments may include an ancillary search engine 126 that is configured to search external ancillary sources of information associated with the locality using the OCR text to identify the type of entity associated with the OCR text. In some embodiments, the ancillary search engine 126 may include a web browser configured to access ancillary sources such as yellow pages for the locality, tourist guides for the locality, etc. As an example, the OCR text "Phoenix," without more, makes identification of the type of entity that is to be assigned to "Phoenix" difficult. However, in at least one embodiment, the ancillary search engine 126 may search the ancillary sources using the text "Phoenix" and find that there is a movie theater by the name of "Phoenix" in the locality. As such, the entity "Phoenix" is classified as a movie theater type entity. Based on the teachings of the present disclosure, it will be recognized that the foregoing entity type assignment operations may be extended to multiple entity types such as, without limitation, hotels, restaurants, schools, retailers, service operators, etc.

In certain embodiments, the locality is assigned a locality profile score by locality assignment engine 128. At least one embodiment, entities of similar entity types are clustered by the locality assignment engine 128. As an example, text such as "school," "college," "University," etc. may be aggregated with one another in an "education" cluster. As another example, theater entities may be aggregated with one another in a "theater" cluster. In certain embodiments, the text used to identify particular entity types may be clustered using a clustering algorithm like, for example, K-means.

In certain embodiments, the locality profile score corresponds to the percentage that an entity type contributes to the overall entity makeup of the locality. As an example, let $x_1$, $x_2$, $x_3$ . . . $x_n$ be the percentage of entities in a text cluster that represents the entire body of entities in the locality. For example, if a locality has 30% schools and 40% theaters, then the locality will have a score of $x_1$=30% school and $x_2$=40% theater. However, in certain embodiments, the entity type $x_i$ is only used in the locality profile score if $x_i$ is greater than a predetermined threshold (e.g. $x_i$>10%). If all $x_i$ are less than 10% the locality may be considered as a mixed locality. In such embodiments, locality profile scores may be assigned to the locality using a percentage based analysis, where a percentage is assigned to each cluster type based on a number of entities included in the cluster type to a total number of clustered entities.

In at least one embodiment, pictorial images, such as street view images, of the identified entities and/or areas proximate to the identified entities may be retrieved from one or more online sources. In at least one embodiment, the street view images are provided to a CNN of a street view classification engine 130 and used to further assign economic classifications to the locality. In at least one embodiment, a CNN trained on a given entity type is used to assign further classifications to an entity of the given entity type based on the street view image of the entity and/or street view images of areas proximate the entity. For example, the street view image of a school in the locality may be provided to a CNN trained on school images from multiple training sources. The CNN may use the street view image of the school to classify the school based on its size (e.g., large, medium, small), based on visual features of the school indicative of income demographics (e.g., high-income, middle-income, low-income), etc. in certain embodiments, the locality profile score and street view classification for the locality and entities within the locality are proper provided to score/classification storage 132. In various embodiments, without limitation, the data in the score/classification storage 132 may be retained directly in local memory, offloaded to external storage, etc.

Certain embodiments of the information handling system 100 include a business analytics engine 134. In certain embodiments, the business analytics engine correlates locality profile scores and street view classifications to accounts existing in historical business records 136 so that the locality profile scores and/or street view classifications may be used by the business analytics engine 134 in predicting a sequence of products that are likely to be purchased by entities having the same entity type within a region, tier, and/or business. In certain embodiments, the business analytics engine 134 is configured to group entities having the same entity type into an entity set. In certain embodiments, the business analytics engine 134 retrieves historical purchasing data for the set of entities for products purchased over a predetermined period of time and generates similarity scores indicative of a comparative similarity of purchasing characteristics of the entities. In certain embodiments, the business analytics engine 134 generates a sequence of products likely to be purchased by a target entity as a function of: similarity of purchasing characteristics of the target entity with respect to other entities in the set of entities, product sequences found in product purchase histories in the historical purchasing data of other entities in the set of entities, and entity profile weights extracted from the locality profile scores of other entities in the set of entities that have purchased one or more of the same products as the target entity. In certain embodiments, entity profile weights are extracted from locality profile scores. For example, if a locality has a locality profile score of 20% IT entities, 30% restaurants, 22%, and 28% education, the entity profile weight of an education entity residing in the locality is 28%.

Figure 2:
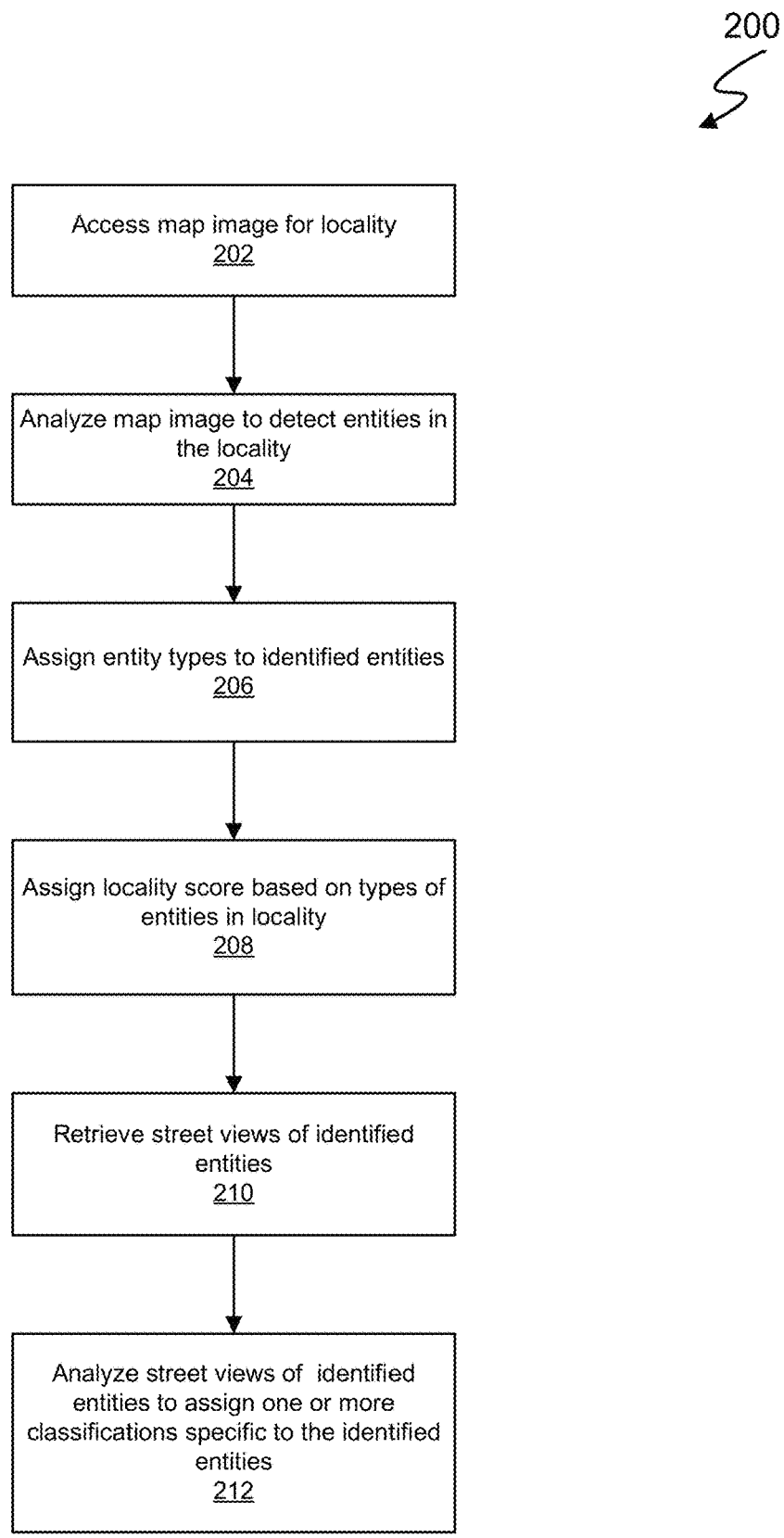
FIG. 2 is a flowchart depicting exemplary operations that may be executed in certain embodiments of the disclosed system.

FIG. 2 is a flowchart 200 depicting exemplary operations that may be executed in certain embodiments of the disclosed system. In this example, a map image for a locality that is to be analyzed is accessed at operation 202. At operation 204, the map image is analyzed to detect entities in the locality. Entity types are assigned to the detected entities at operation 206, and a locality profile score is assigned to the locality at operation 208 based on the types of entities in the locality. In certain embodiments, street views of the detected entities are retrieved at operation 210 and analyzed at operation 212 to assign further classifications to the entities based on the entity images and/or images of areas proximate the entity.

Figure 3:
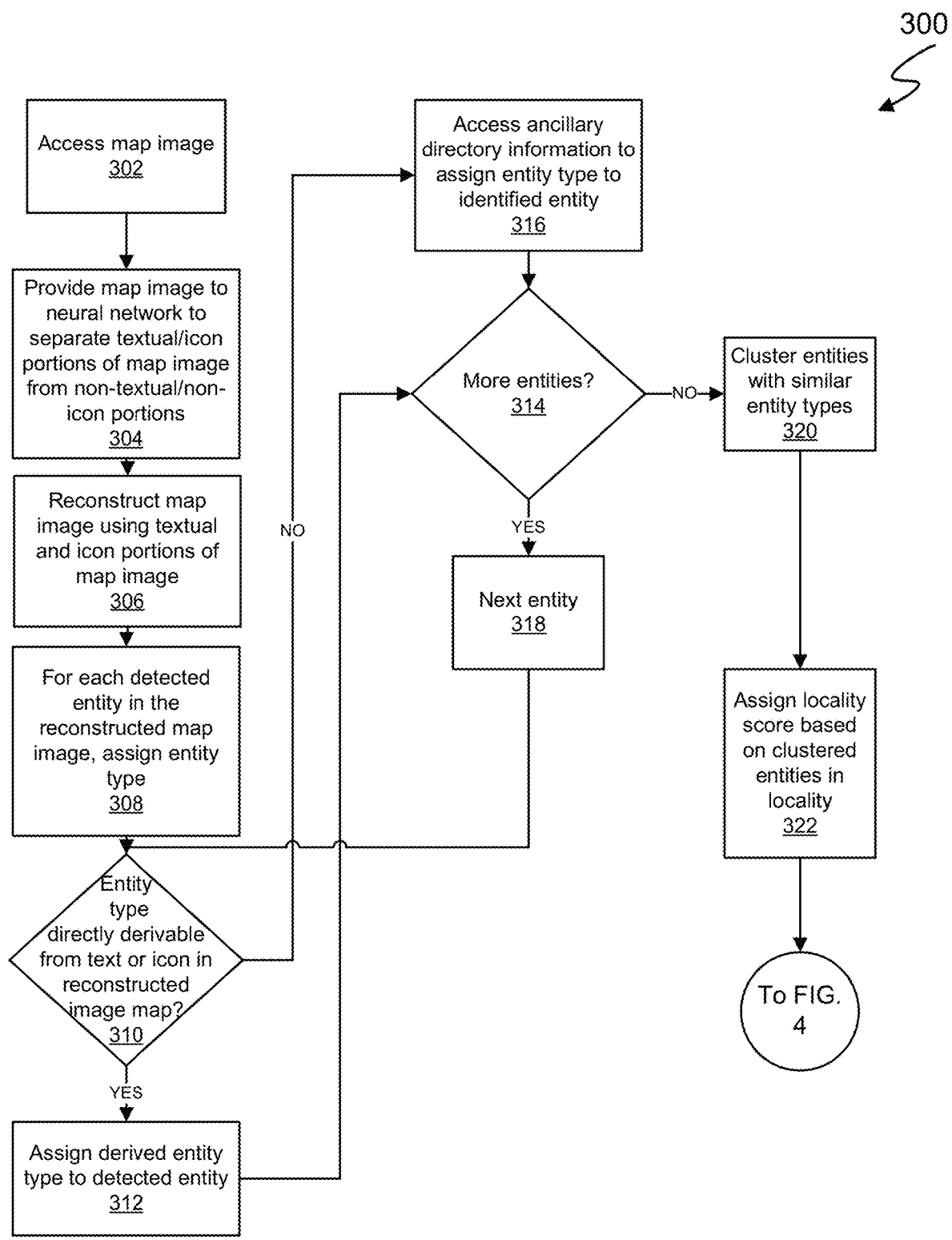
FIG. 3 is a flowchart depicting exemplary operations that may be executed in certain embodiments of the disclosed system.
Figure 4:
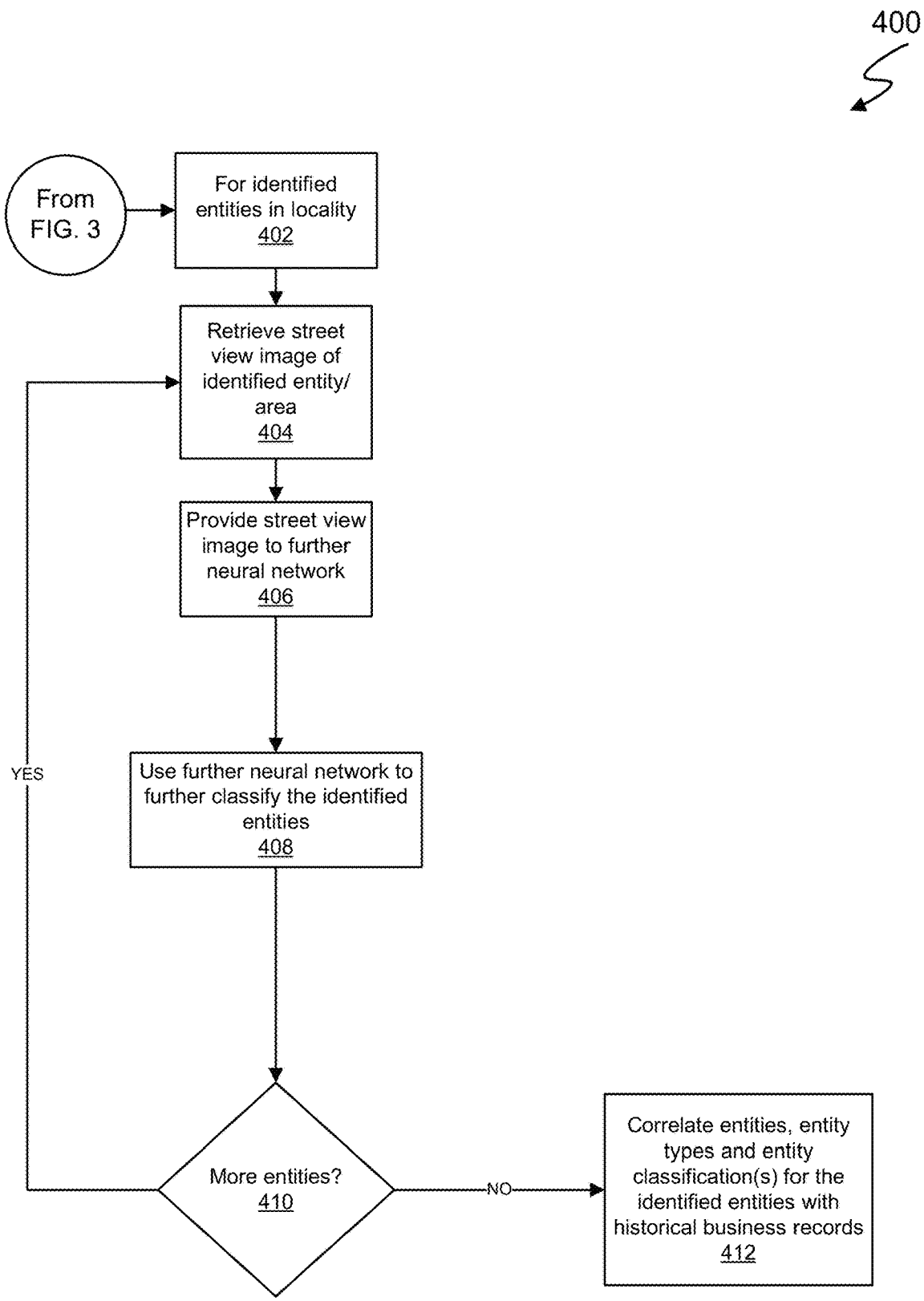
FIG. 4 is a flowchart depicting exemplary operations that may be executed in certain embodiments of the disclosed system.

FIG. 3 is a flowchart 300 and FIG. 4 is a flowchart 400 depicting exemplary operations that may be executed in certain embodiments of the disclosed system. With reference to flowchart 300, a map image for the locality that is to be analyzed is accessed at operation 302. At least one embodiment, the map image is provided to a CNN at operation 304 to separate textual/icon portions of the map image from non-textual/non-icon portions of the map image. In at least one embodiment, the CNN reconstructs the map image at operation 306 using the textual and/icon portions of the map image.

Beginning at operation 308, detected entities in the reconstructed map image are assigned an entity type (e.g., school, theater, retailer, service center, office complex, etc.). To this end, certain embodiments determine at operation 310 whether the entity type is directly derivable from the text associated with the entity or an icon proximate the text for the entity in the reconstructed map image. If the entity type is directly derivable, the entity is assigned the derived entity type at operation 312, and a check is made at operation 314 as to whether or not there are more entities for which an entity type is to be assigned.

If the entity type cannot be directly derived from the text and/or icon information for the entity at operation 310, ancillary directory information may be accessed for the entity at operation 316. In one example, text associated with the detected entity is extracted using, for example, an OCR technique. The OCR text (e.g., "Phoenix") is then used to search the ancillary directory information to provide a more specific name or description of the entity (e.g., "Phoenix Multiplex Theater"). Using the ancillary directory information, the detected entity "Phoenix" in this example is assigned an entity type of "theater" or "multiplex theater."

After an entity has been assigned an entity type at either operation 312 or operation 316, a check is made at operation 314 to determine whether there are more detected entities that are in need of an entity type assignment. If so, the entity type assignment operations are executed with the next entity starting at operation 318.

Embodiments of the disclosed system assign locality profile scores to a locality based on the types of entities found in the locality. In one example, all entities with similar entity types are clustered at operation 320. As an example, entities having an entity type of "school," "University," "college," etc. may be clustered as "education" entities. As a further example, entities having an entity type of "cinema," "movie," "movie house," etc., may be clustered as "movie theater" entities. As a further example, entities having an entity type of "boarding-house," "court," "lodging," etc., may be clustered as "hotel" entities. At operation 322, a locality profile score is assigned to the locality based on the clustered entities. In at least one embodiment, the locality profile score corresponds to the percentage that an entity type contributes to the overall entity makeup of the locality.

FIG. 4 is a flowchart 400 of additional operations that may be executed in certain embodiments of the disclosed system to provide further classifications for the identified entities. In this example, for each of the entities identified in the locality at operation 402, a street view image of the identified entity and/or area proximate the entities retrieved at operation 404. Street view images for an entity may be obtained in a number of different manners from different sources. In at least one embodiment, the text identifying the entity is used to generate a query that is used to retrieve images from, for example, as Google's Street View database. In certain embodiments, the text identifying the entity may be used to generate an Internet search to access the website of the entity having entity images. Based on the teachings of the present disclosure, other means of accessing entity images from public and/or private data stores may be employed.

In certain embodiments, the street view image retrieved at operation 404 is provided to the input of a CNN at operation 406. At operation 408, certain embodiments of the CNN further classify the identified entities using the corresponding street view images. In one example, the CNN may assign further classifications to a school entity based on the appearance of the entity in the school image. Certain characteristics of the image may be used to classify the size of the school, the likely income demographics of the school, whether the school facility is likely to have a sports program, etc. In another example, the CNN may classify a hotel entity based on, for example, the size of the hotel entity, the likely income demographic of the hotel entity, whether the hotel entity is a luxury hotel, etc. In at least one embodiment, the image for the entity is presented to a CNN that has been trained on the same type of entity. As an example, the image of a school entity will be provided to a CNN that has been trained to classify school entities. Similarly, the image of a hotel entity will be provided to a CNN that has been trained to classify hotel entities. As will be recognized from the teachings of the present disclosure, the classifications provided by the CNN are the subject of design choice and may be selected to represent further entity classifications that are useful for various tactical and strategic business goals.

Once a further classification, if any, is assigned to an entity at operation 408, a check is made at operation 410 to determine whether any more entities are to be further classified using the street view image of the entity. If more entities are to be subject to further classification, certain embodiments continue to implement operations 404, 406, and 408 until such here are no more entities that are subject to further classification. Entities that have been assigned an entity type and classified within the locality may be correlated with historical records at operation 412 for use in subsequent business analytics applications.

Figure 5:
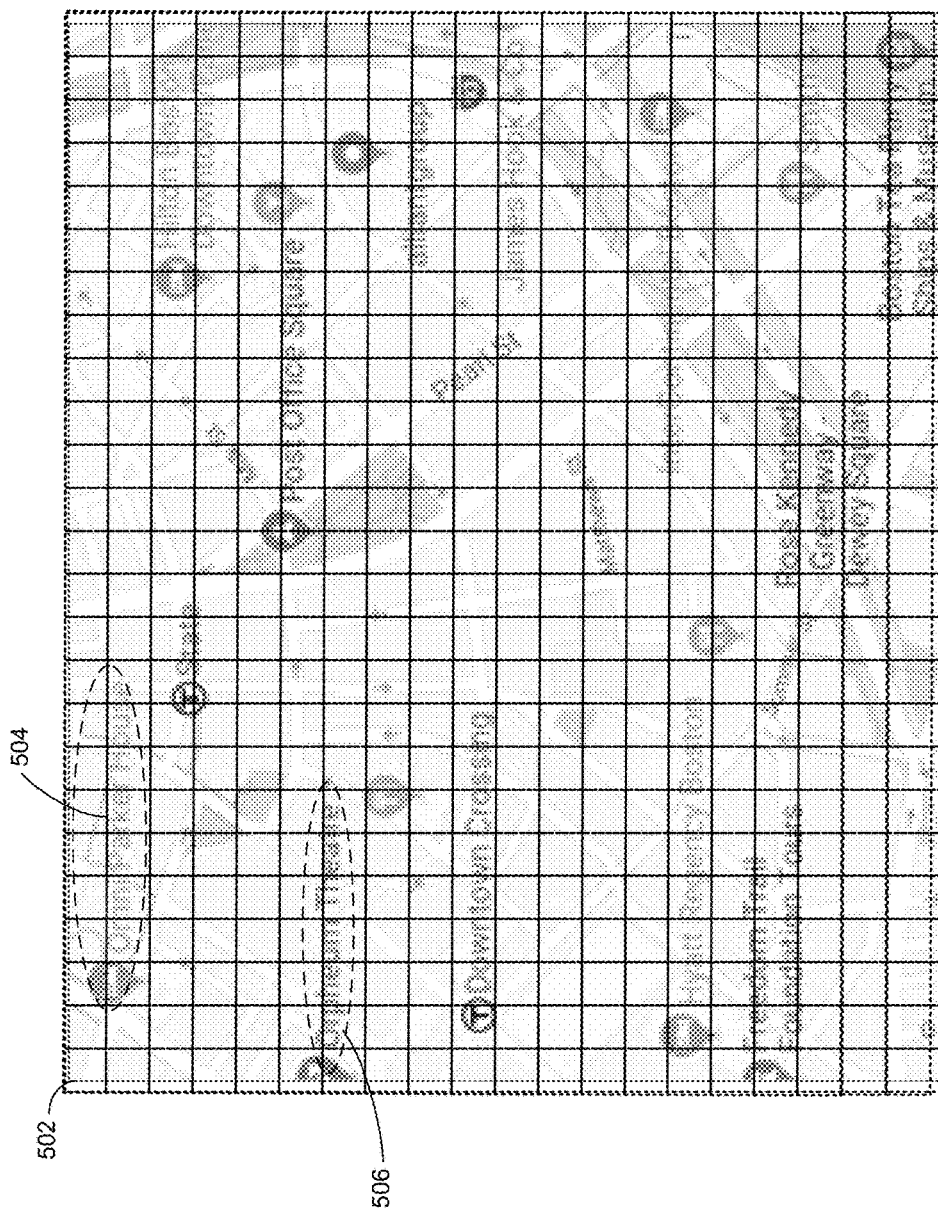
FIG. 5 shows an exemplary map image of a locality that may be analyzed using certain embodiments of the disclosed system.

FIG. 5 shows an exemplary map image 500 of a locality that may be analyzed using certain embodiments of the disclosed system. The specific example shown in FIG. 5 is a map image of an area of downtown Boston, MA. Map image 500 includes regions of segmented pixel areas 502 that form text images and icon images. In this example, the map image 500 includes a region 504 of segmented pixel areas 502 containing an image representing the text "Omni Parker House." Another portion of the map image 500 includes a region 506 of segmented pixel areas 502 containing an image representing the text "Orpheum Theater." Other regions of the map image include segmented pixel areas corresponding to images of other text and/or icons.

Figure 6:
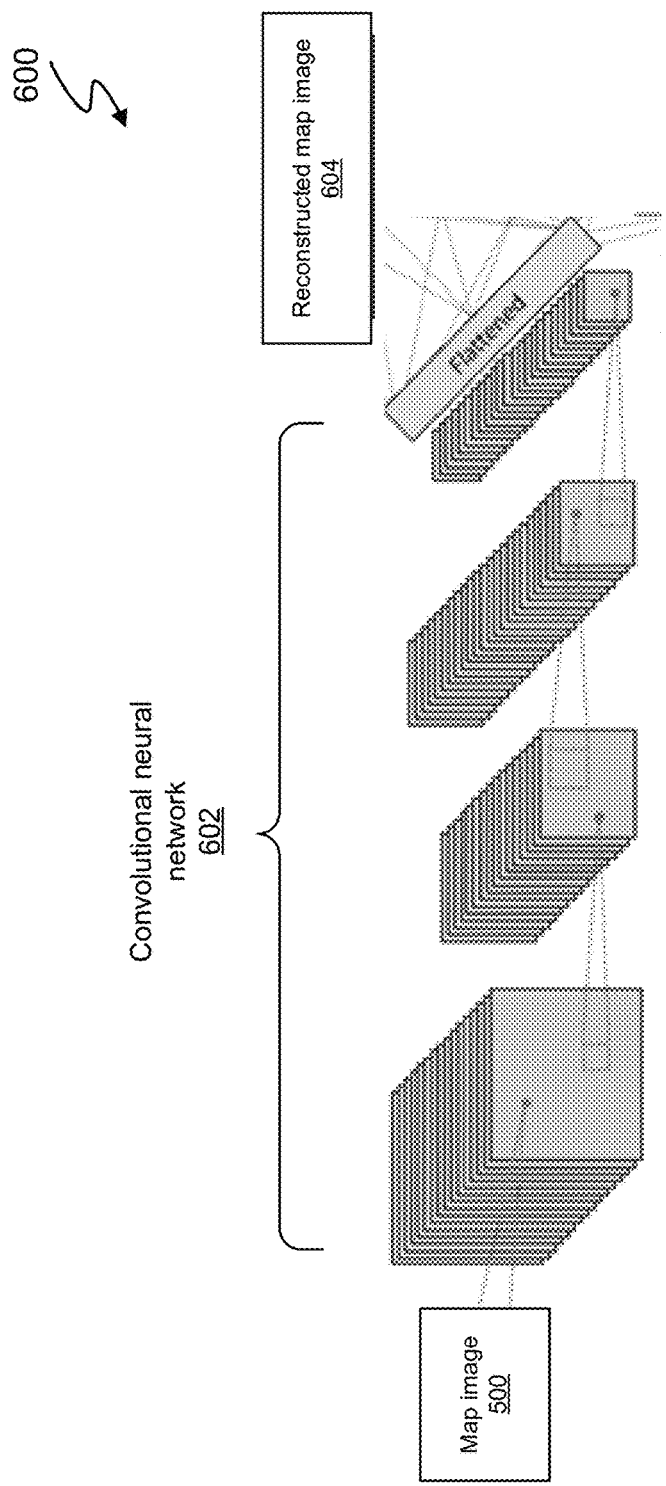
FIG. 6 shows a neural network environment that may be used in certain embodiments of the disclosed system.

FIG. 6 shows a neural network environment 600 that may be used in certain embodiments of the disclosed system. In this example, the map image 500 is provided to the input of a convolutional neural network 602. The convolutional neural network 602 is trained to extract regions of segmented pixel areas of the map image 500 representing text and/or icons. In FIG. 6, the convolutional neural network reconstructs the map image using the text and/or icon pixel regions and presents the reconstructed map image 604 at the output of the convolution neural network 602.

Figure 7:
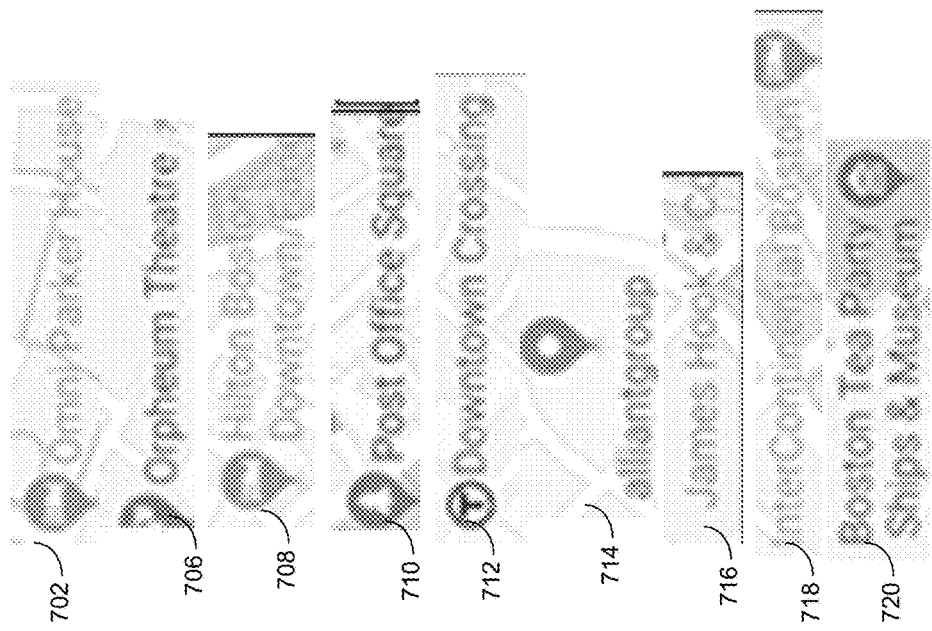
FIG. 7 shows one example of a reconstructed map image.

FIG. 7 shows one example of a reconstructed map image 700. As shown in this example, the convolutional neural network 602 has extracted regions of the map image 500 having text and/or icons and aggregated the regions in a manner that allows for subsequent entity identification operations. For example, the pixel segments of region 504 of FIG. 5 have been reconstructed by the convolutional neural network 602 as region 702 in the reconstructed map image 700. The pixel segments of region 506 of FIG. 5 have been reconstructed by the convolutional neural network 602 as region 706 in the reconstructed map image 700. FIG. 7 also shows regions 708-720 that have been reconstructed from map image 500 by the convolutional neural network 602.

Figure 8:
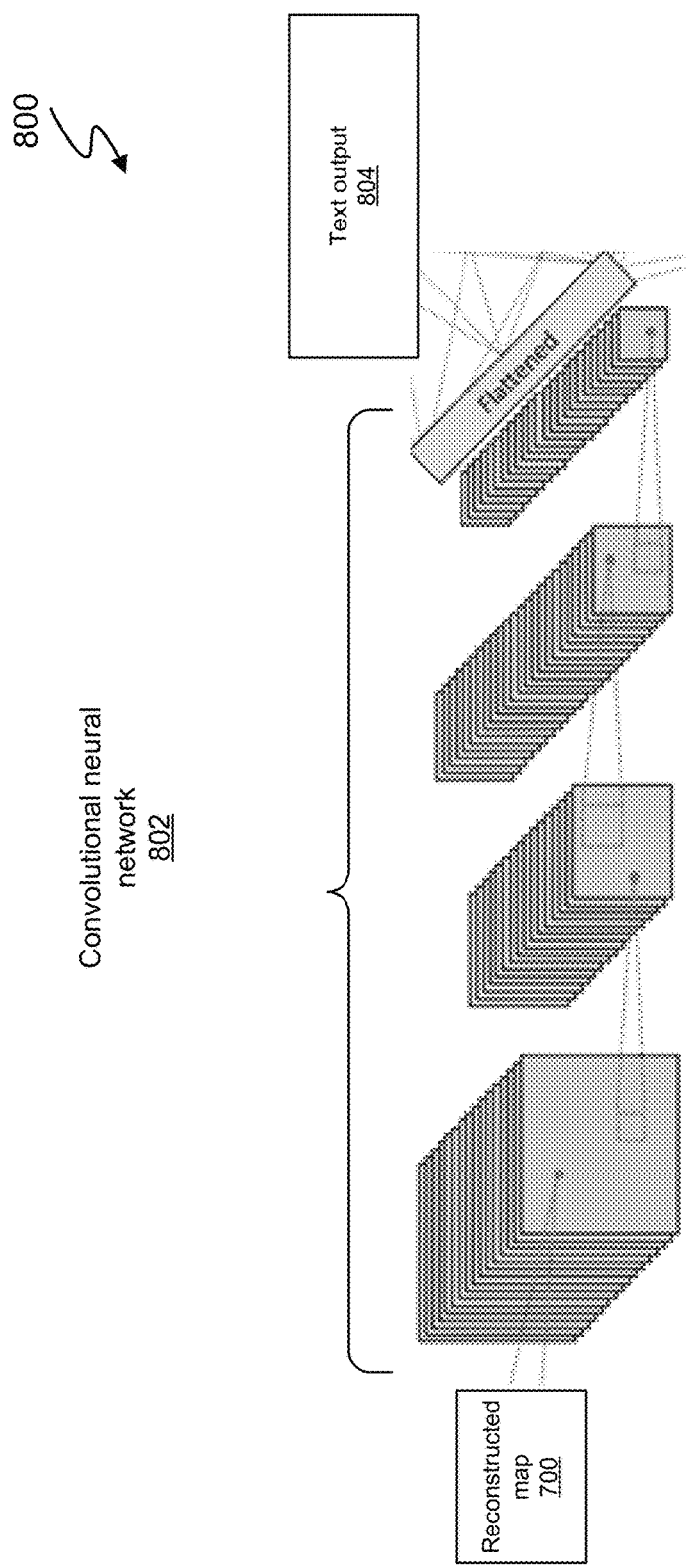
FIG. 8 shows a neural network environment that may be used in certain embodiments of the disclosed system.

FIG. 8 shows a neural network environment 800 that may be used in certain embodiments of the disclosed system. In this example, the reconstructed map image 700 is provided to the input of a convolutional neural network 802. In certain embodiments, the convolutional neural network conducts an OCR operation on the reconstructed map image 700 to identify entities present in the reconstructed map image 700. In at least one embodiment, the convolutional neural network 802 provides a text output 804 including text corresponding to the names of entities found in the reconstructed map image 700. In at least one embodiment, the text output 804 includes a textual identification of an entity type for an entity name based on an icon that is detected in a vicinity proximate the entity name in the reconstructed map image. For example, without limitation, the text output for region 702 of the reconstructed map image 700 is "Omni Parker House." However, the "Omni Parker House" entity is associated with a hotel icon in region 702. Accordingly, some embodiments may associate the text "hotel" (or other appropriate entity type classification) in the text output 804 with the entity name "Omni Parker House."

In certain embodiments, map reconstruction operations and text recognition operations may be executed using a single convolutional neural network. In such embodiments, convolutional neural network 602 and convolutional neural network 802 may be consolidated as a single convolutional neural network that extracts textual and/or icon regions of a map image for a locality, reconstructs a map image using the extracted textual and/or icon regions of the map image and detects text associated with entities in the locality.

Figure 9:
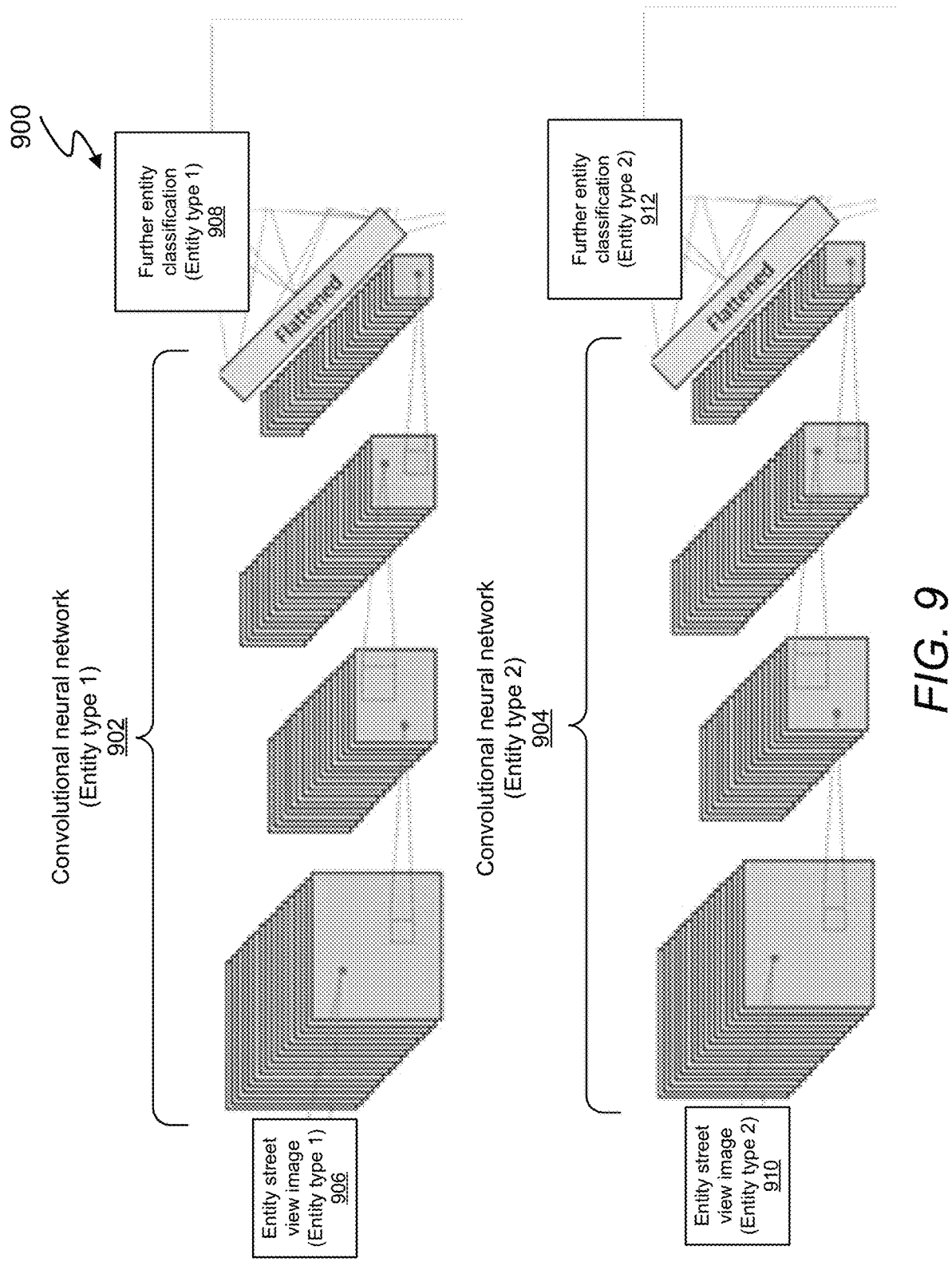
FIG. 9 shows a neural network environment that may be used in certain embodiments of the disclosed system.

FIG. 9 shows a neural network environment 900 that may be used in certain embodiments of the disclosed system. The neural network environment 900 includes convolutional neural network 902 and convolutional neural network 904 that are configured to assign further classifications to entities based on a street view images of the entities. In certain embodiments, convolutional neural network 902 has been trained to classify entities of a first type (Entity type 1, such as educational entities), while convolutional neural network 904 has been trained to classify entities of a second type (Entity type 2, such as retail entities). In at least one embodiment, street view images 906 of entities of entity type 1 are provided to the input of the convolutional neural network 902, which provides a further entity classification for type 1 entities at output 908. In at least one embodiment, street view images 910 of entities of entity type 2 are provided to the input of the convolutional neural network 904, which provides a further entity classification for the type 2 entities at output 912. Although separate convolutional neural networks are used to classify different entity types, some embodiments may employ individual convolutional neural networks that have been trained and configured to operate on images of multiple entity types.

Figure 10:
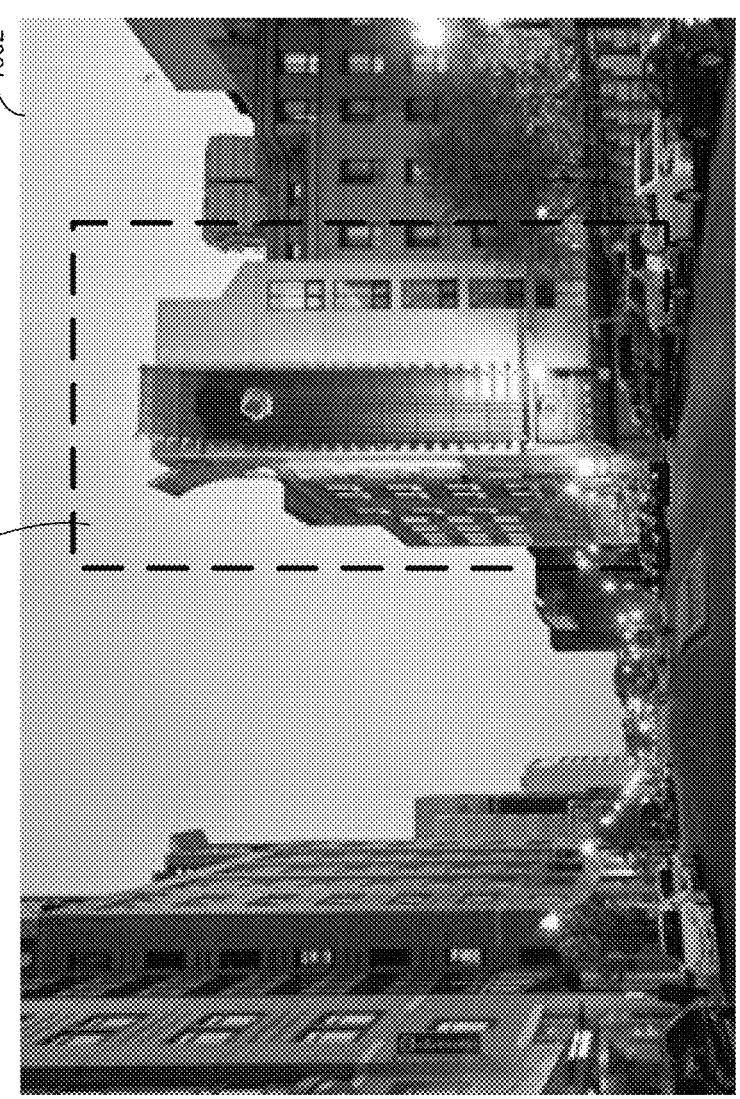
FIG. 10 is an illustration of an economic classification that has been assigned to an entity based on the street view image of the entity and/or area proximate the entity.

FIG. 10 is an illustration 1000 of a further classification that has been assigned to an entity based on the street view image 1002 of the entity. In this example, street view image 1002 includes an image region 1004 of a hotel entity that is to be classified using a convolutional neural network that has been trained using, for example, hotel images and/or images associated with the dominant entity type and the locality. One example of classifications that may be assigned to the entity in image region 1004 as shown in table 1006. Here, the type of building is classified as a "Hotel," the nature of the hotel is "Luxury," and the entity is in a locality that has been generally identified as "Downtown." Further, the locality in which the hotel is located has been classified as a high economic classification, meaning that the locality may be associated with significant income and/or entity spending on products or services.

Certain embodiments of the disclosed system may be configured to predict a likelihood that an entity may purchase a sequence of products. For example, certain embodiments may determine the "n" sequence number of products that are likely to be sold to the entity. As an example, when n=3, certain embodiments determine the subsequent products and product sequence that are like to be sold to the entity (e.g., Product 4, Product 2, Product 5).

Figure 11:
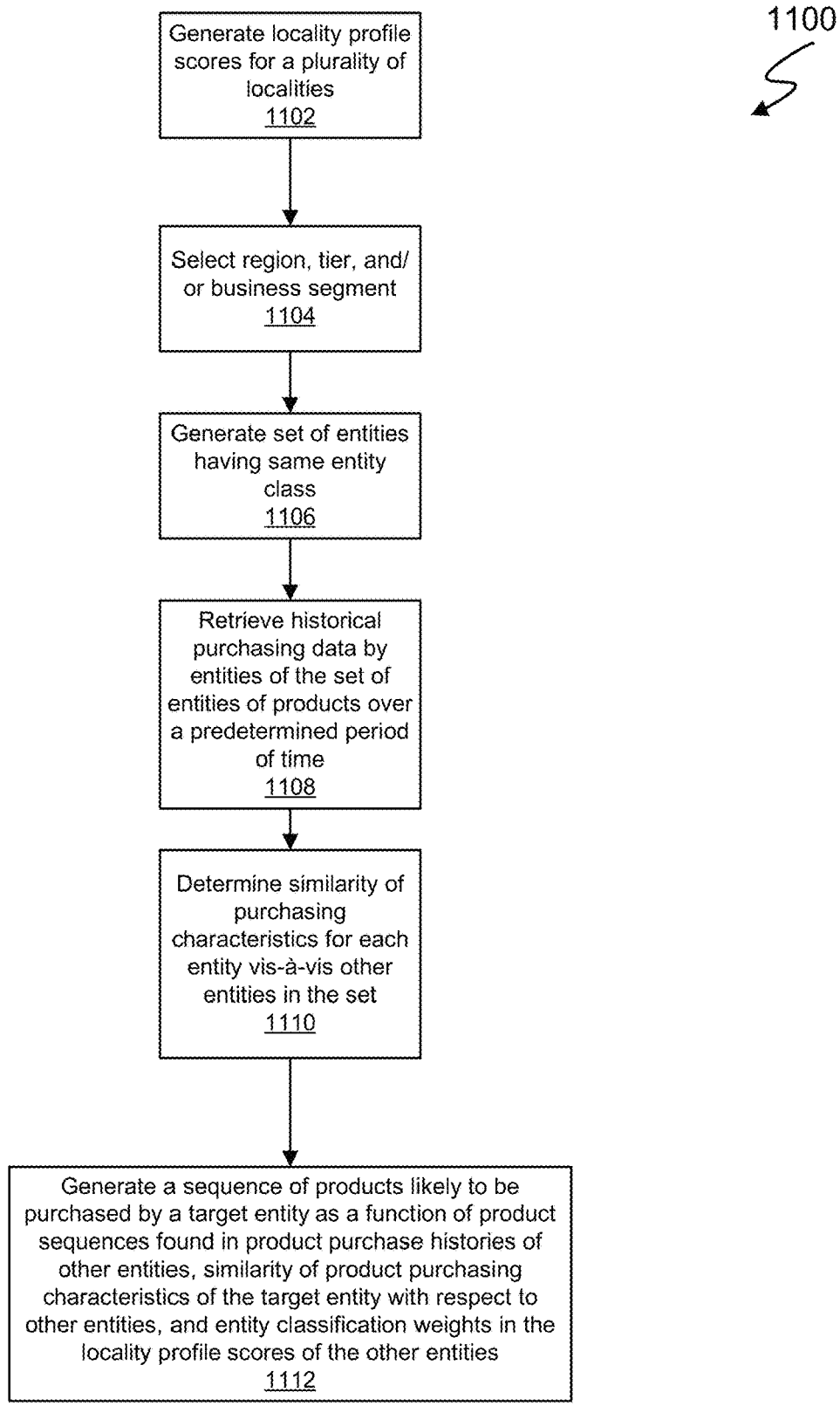
FIG. 11 is a flowchart showing exemplary operations that may be implemented in certain embodiments of the disclosed system to predict likely product sequences that will be purchased by a target entity.

FIG. 11 is a flowchart 1100 showing exemplary operations that may be implemented in certain embodiments of the disclosed system to predict likely product sequences that will be purchased by a target entity. In this embodiment, the locality profile scores for a plurality of localities are generated at operation 1102, as described herein. At operation number 1104, the region, tier, and/or business segment (e.g., targeted business sector) that is to be analyzed is selected. The targeted business sector will typically include multiple localities for which locality profile scores have been determined.

In certain embodiments, a set of entities having the same entity class are generated from the entities in localities of the targeted business sector at operation number 1106. At operation 1108, historical purchasing data is retrieved for each of the entities in the set. In certain embodiments, the purchasing data reflects products that were purchased by the entity over a predetermined historical period of time.

In certain embodiments, the similarity of purchasing characteristics of each entity vis-à-vis other entities in the set of entities is determined at operation 1110. In at least one embodiment, whether an entity has product purchasing characteristics that are similar to another entity may be determined using normalized product revenues of the entities over the predetermined period of time.

At operation 1112, sequences of products likely to be purchased by the entities in the set of entities are generated. In at least one embodiment, a sequence of products likely to be purchased by an entity is generated as a function of product purchase sequences found in product purchase histories of other entities, the similarity of product purchasing characteristics of the entity with respect to other entities in the set, and entity profile weights of the locality profile score of the other entities in the set. After the standardized product revenues have been determined for all entities in the set, certain embodiments may continue on to execute an entity similarity analysis at operation 1220, which is used to assess the similarity of purchasing characteristics that each entity has with respect to other entities in the set.

Figure 12:
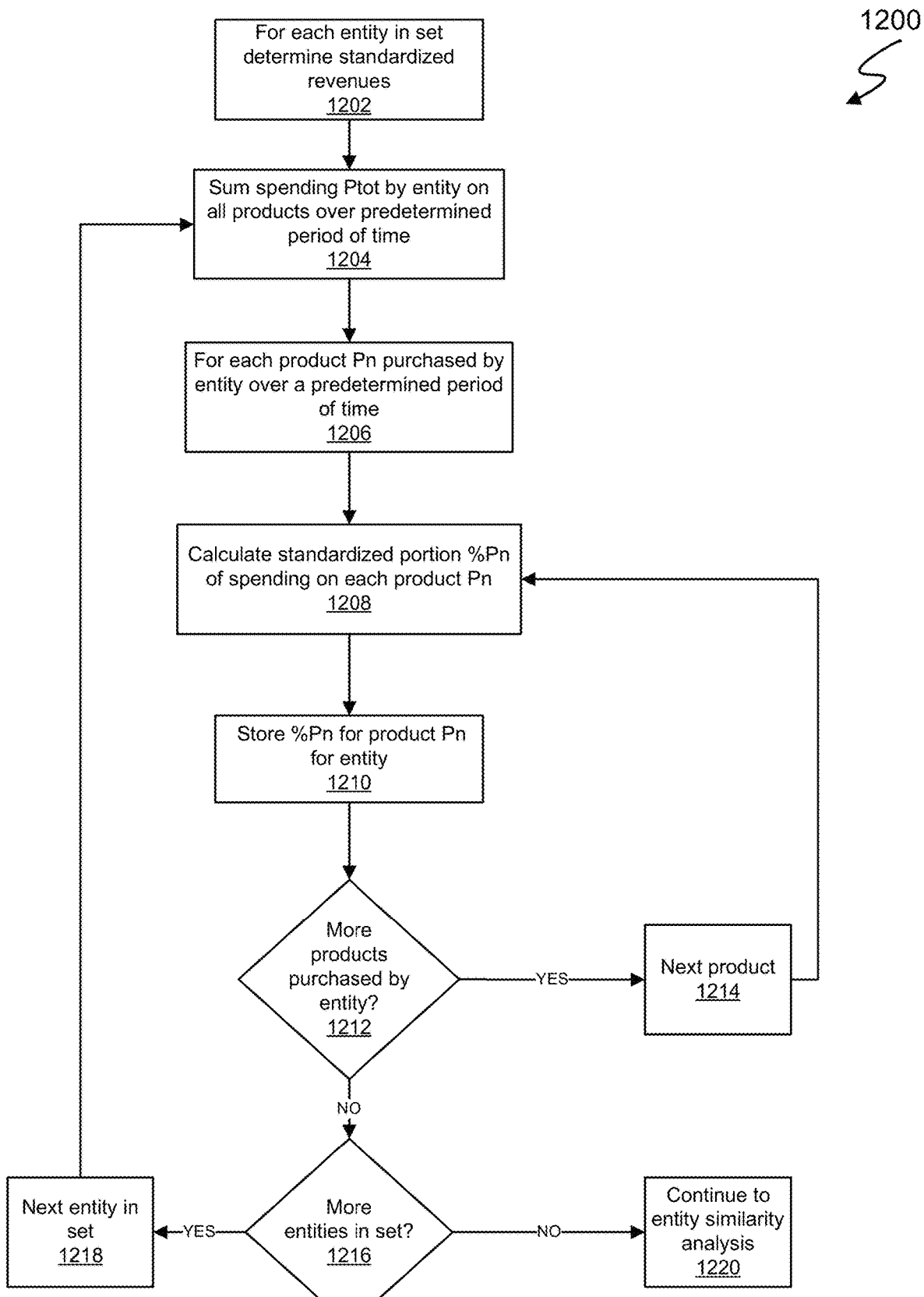
FIG. 12 is a flowchart showing exemplary operations that may be executed in certain embodiments to generate values for the standardized product revenues of the entities.

FIG. 12 is a flowchart 1300 showing exemplary operations that may be executed in certain embodiments to generate values for the standardized product revenues of the entities. In this example, the standardized product revenues are determined for each entity in the set of entities (as indicated at operation number 1302). The total spending Ptot on all products by the entity is calculated at operation 1204. For each product Pn purchased by the entity over the predetermined period of time (as indicated at operation 1206), the standardized portion (shown here as a percentage % Pn) for the product Pn is calculated at operation 1208 and stored for the entity at operation 1210. At operation 1212, certain embodiments determine whether there are more products that have been purchased by the entity for which the standardized portion is to be calculated. If there are more products purchased by the entity, the next product is selected at operation 1214 and the calculation and storage operations of 1208 and 1210 are repeated for the next product purchased by the entity.

Once the standardized product revenue for all products purchased by the entity have been calculated, certain embodiments make a check at operation 1216 as to whether there are more entities in the set for which standardized product revenue is to be calculated. If there are more entities in the set for which standardized product revenues to be calculated, the next entity in the set is retrieved at operation 1218 and standardized product revenues are generated for all products purchased by the next entity. In certain embodiments, the illustrated operations are completed until all products purchased by all entities have been standardized.

In one example, normalized product revenues may be assigned to each entity as vector components. As an example, assume that entity A1 has purchased $15,000 of product P1, $500,00 of P2, $800,000 on P3, and nothing on P4. The total revenue spent by entity A1 on all products is $1,315,000. The standardized product revenue spent by an entity A1 on product P1 is therefore is approximately 1% (e.g., ($15,000/$1,315,000)×100). Similarly, the standardized product revenue spent by entity A1 on product P2 is 38%, on product P3 is 61% The standard product revenue values may be assigned as vector components of a purchasing vector PA1 for A1. In a similar manner, another entity A2 may have a purchasing vector PA2. In certain embodiments, a cosine similarity operation may be executed on the vectors PA1 and PA2 to assess the similarity of the purchasing characteristics of A1 with respect to A2. Similarity comparisons are made between vector P1 and vectors for other entities in the set of entities to assess the similarity of the purchasing characteristics of A1 with respect to the other accounts in the entity set. In certain embodiments, the similarity is expressed as a similarity score (e.g., percentage, number between 0 and 1, etc.). It will be recognized, however, in view of the teachings of the present disclosure that statistical analyses may be employed to determine whether the purchasing characteristics of two or more accounts are similar.

Figure 13:
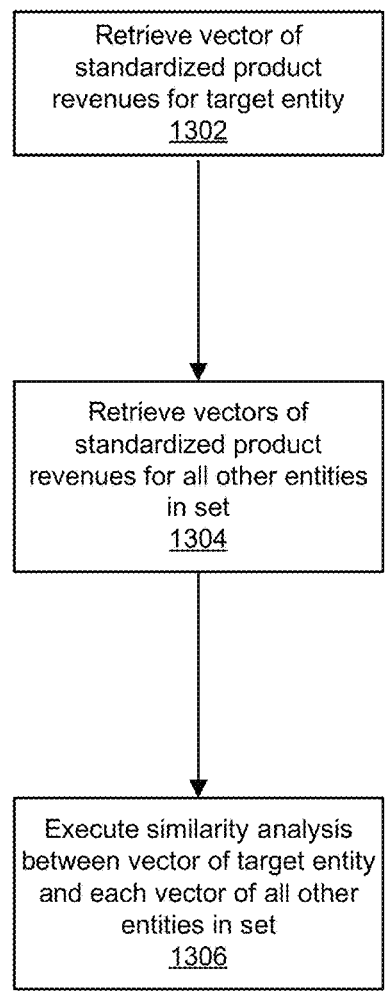
FIG. 13 is a flowchart showing exemplary operations that may be executed by certain embodiments to assess the similarity between the purchasing characteristics of a target entity and the purchasing characteristics of other entities in a set of entities.

FIG. 13 is a flowchart 1300 showing exemplary operations that may be executed by certain embodiments to assess the similarity between the purchasing characteristics of a target entity (e.g., entity for which a product purchasing sequence is to be generated) and the purchasing characteristics of other entities in the set of entities. In this example, the vector for the standardized product revenues of the target entity is retrieved at operation 1202. At operation 1204, the vectors of the standardized product revenues for all other entities in the set are retrieved. At operation 1206, certain embodiments execute a similarity analysis between the vector of the target entity and each vector of all other entities in the set. In certain embodiments, operation 1206 results in individual similarity scores comparing the target entity with each other entity in the set.

Figure 14:
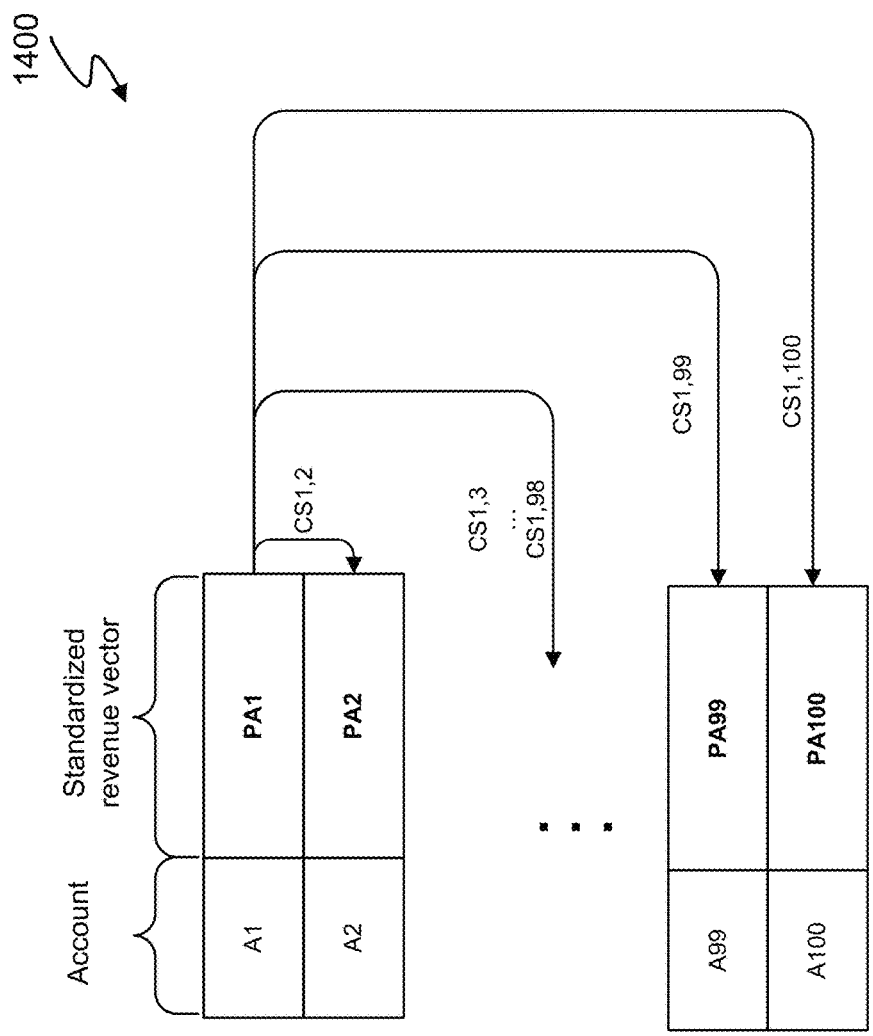
FIG. 14 is a diagram showing one manner of generating similarity scores between a target entity A1 and other entities, A2 through A100, of an entity set.

FIG. 14 is a diagram 1400 showing one manner of generating similarity scores between a target entity A1 and other entities, A2 through A100, assuming the set include one hundred entities. In this example, the standardized revenue vector PA1 is compared to the standardized revenue vector PA2 for entity A2 to generate a cosine similarity score CS1,2 that measures the similarity of the product purchasing characteristics of entities A1 and A2. Similarly, the standardized revenue vector PA1 is compared with standardized revenue vectors PA3 through PA100 to generate respective cosine similarity scores CS1,3 through CS1,100. As noted, entity A1 is the target entity in the embodiment shown in FIG. 13 and, as such, the cosine similarity scores CS1,2 through CS1,100 can be used to predict a sequence of products that entity A1 is likely to purchase. However, if the target entity is associated with entity A2, then certain embodiments of the disclosed system will generate cosine similarity scores CS2,1, CS2,3 through CS2,100, which can be used to predict a sequence of products that entity A2 is likely to purchase.

Figure 15:
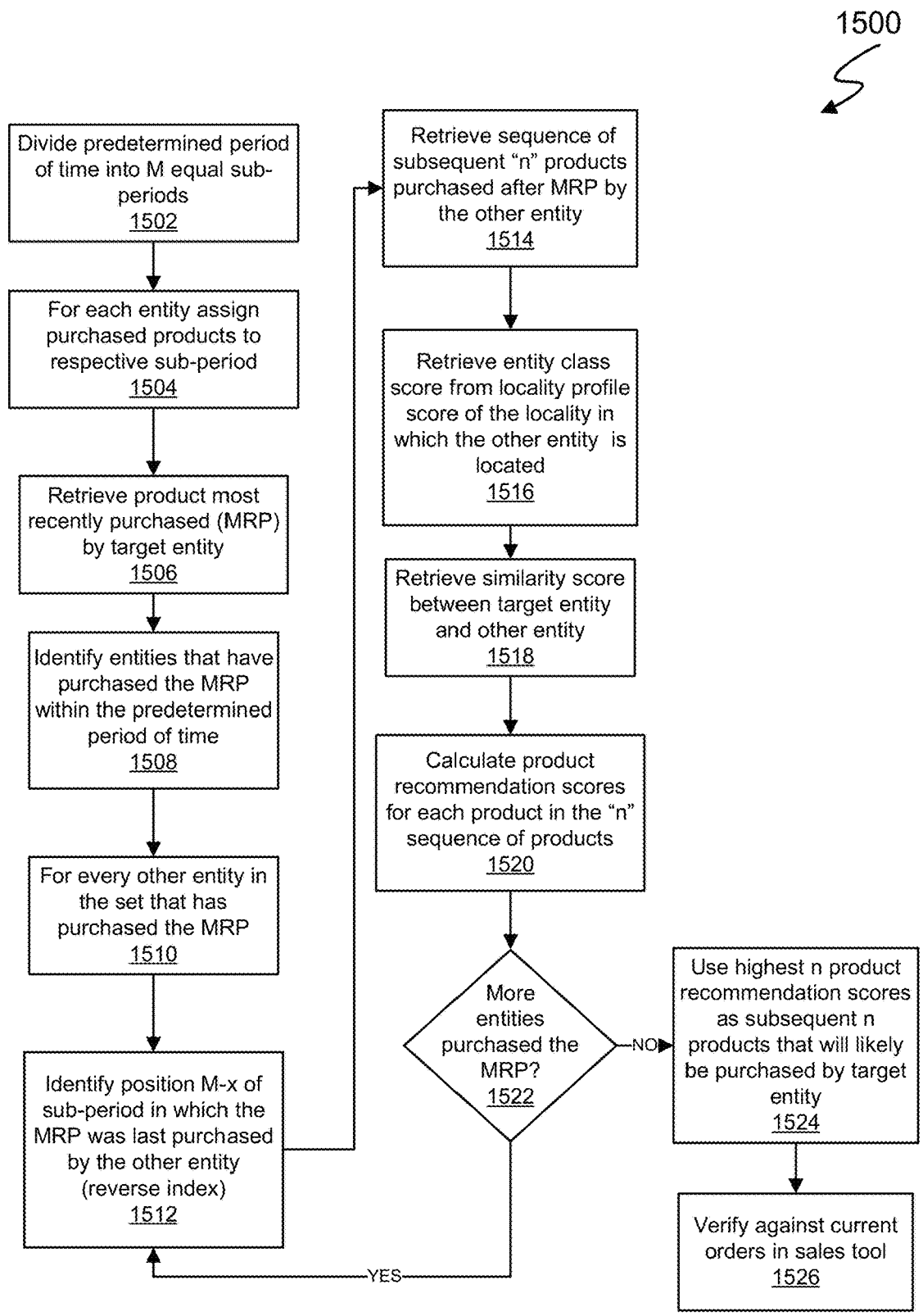
FIG. 15 is a flowchart showing exemplary operations that may be executed by certain embodiments of the disclosed system to predict the next "n" sequence of products that are likely to be purchased by a target entity.

FIG. 15 is a flowchart 1500 showing exemplary operations that may be executed by certain embodiments of the disclosed system to predict the next "n" sequence of products that are likely to be purchased by a target entity. In this example, a predetermined time period of interest is divided into M equal sub-periods at operation. As an example, the predetermined time period of interest may be the immediately preceding five years of product sales, which can be divided into sixty one-month sub-periods. At operation 1504, certain embodiments assign the products that have been purchased by each entity to respective sub-periods. As an example, the products purchased by entity A1 during sub-period X are assigned to sub-period X for A1.

In subsequent operations, certain embodiments determine the next "n" product sequence that is likely to be purchased by the target entity. In this example, the product that was most recently purchased (MRP) is retrieved at operation 1506. At operation 1508, a search is made for other entities that have purchased the MRP within the predetermined time period. For every other entity that has purchased the MRP at operation 1510, the position of the sub-period in which the MRP was last purchased by the other entity is identified at operation 1512. In certain embodiments, the position of the sub-period may be expressed as a reverse index that progresses back in time from the end of the predetermined period of interest. As an example, a product purchased three months before the end of a predetermined period of interest may have a reverse index of −3, while a product purchased two years before the end of the predetermined period of interest may have a reverse index of −24.

Once certain embodiments have identified the position of the product in the account of the other entity, certain embodiments capture the subsequent "n" sequence of products purchased by the other entity at operation 1514. As an example, if the system is to predict the next four products that are likely to be purchased by the target entity, then n=4 and, as such, the subsequent four products purchased by the other entity are used in the prediction analysis. As another example, if the system is to predict the next two products that are likely to be purchased by the target entity, then n=2 and, as such, the subsequent two products purchased by the other entity are used in the prediction analysis.

At operation 1516, the entity profile weight is extracted from the locality profile score of the locality in which the other entity is located. For example, if a locality has a locality profile score of 20% IT entities, 30%, restaurants, 22%, and 28% education, the entity profile weight of an education entity residing in the locality is 28%. Certain embodiments use entity profile weights to give greater weight to predictive data obtained from entities located in localities having a higher entity profile weight for the entity class than to predictive data obtained from the same type of entity in a locality having a lower entity profile weight for the entity class. In certain embodiments, different entities in the set may be located in different localities and have differing entity profile weights. As an example, the set of entities may consist of entities having an "education" entity class. In this example, the locality profile score for the "education" entity class of the locality in which the other entity (e.g., entity from which predictive data is obtained) is located is retrieved. For example, an education entity in Locality A may have an entity profile weight of 20% while an education entity in Locality B may have an entity profile weight of 10%. If the target entity is an educational entity, then predictive data obtained from educational entities in Locality A may be given a greater weight than predictive data obtained from education entities in Locality B.

Certain embodiments retrieve similarity score between the target entity and the other entity at operation 1518. As an example, if the target entity is A1 and the "n" product sequence is being extracted from entity A3, the similarity score CS1,3 is retrieved for use in the predictive analysis. Similarly, if the target entity is A1 and the "n" product sequence is being extracted from entity A89, the similarity score CS1,89 is retrieved for use in the predictive analysis.

At operation 1520, a product recommendation score for each product in the "n" product sequence for the target entity is calculated. In certain embodiments, if the MRP is also found in an account for entity A2, the cosine similarity CS1,2 between entities A1 and A2, the reverse index of the sub-period in which the MRP was found in the account of entity A2, the entity profile weight for A2, and subsequent "n" products purchased by entity A2 after the MRP are used to assign a product recommendation score (PRS) for each product in the "n" product sequence. Certain embodiments may calculate the product recommendation score for each product in the "n" product sequence using the following formula, shown here in an example using entity A1 as the target entity and entity A2 as in other entity that purchased the MRP:

Product Recommendation Score $$(PRS) = 1 + \frac{EPW * CS1, 2}{1 + \log(10 + \text{Reverse index}) \times \text{position}}$$

Where:
 CS1,2=Cosine Similarity between A1 and A2;
 EPW=Entity profile weight of A2 in the locality in which A2 is located;
 Reverse Index=(e.g., month index number where the MRP was last purchased by A2); and
 Position=Position after MRP in the sequence of "n" products.

Certain embodiments only calculate product recommendation scores for entities meeting a predetermined threshold of similarity with the target entity.

At operation 1522, a determination is made as to whether there are more entities that purchased the MRP. If other entities have purchased the MRP, certain embodiments repeat the foregoing calculations using data from the other entities that have purchased the MRP. In certain embodiments, where the same product appears in multiple sequences, the product recommendation score for the product is multiplied to arrive at a final product recommendation score. Otherwise, certain embodiments arrive at a final product recommendation score for a given product by adding all product recommendation scores for the given product together.

At operation 1524, the highest "n" product recommendation scores are used as the most likely "n" products that will be purchased by the target entity. In one example, the final product recommendation scores are sorted from high to low, and the highest-scoring "n" products are used for the prediction.

In certain embodiments, the product recommendation sequence may be verified against current orders that are retrieved from a sales tool, such as Salesforce, at operation 1526. In certain embodiments, the product recommendations may be used to supplement sales predictions made using a sales tool.

Figure 16:
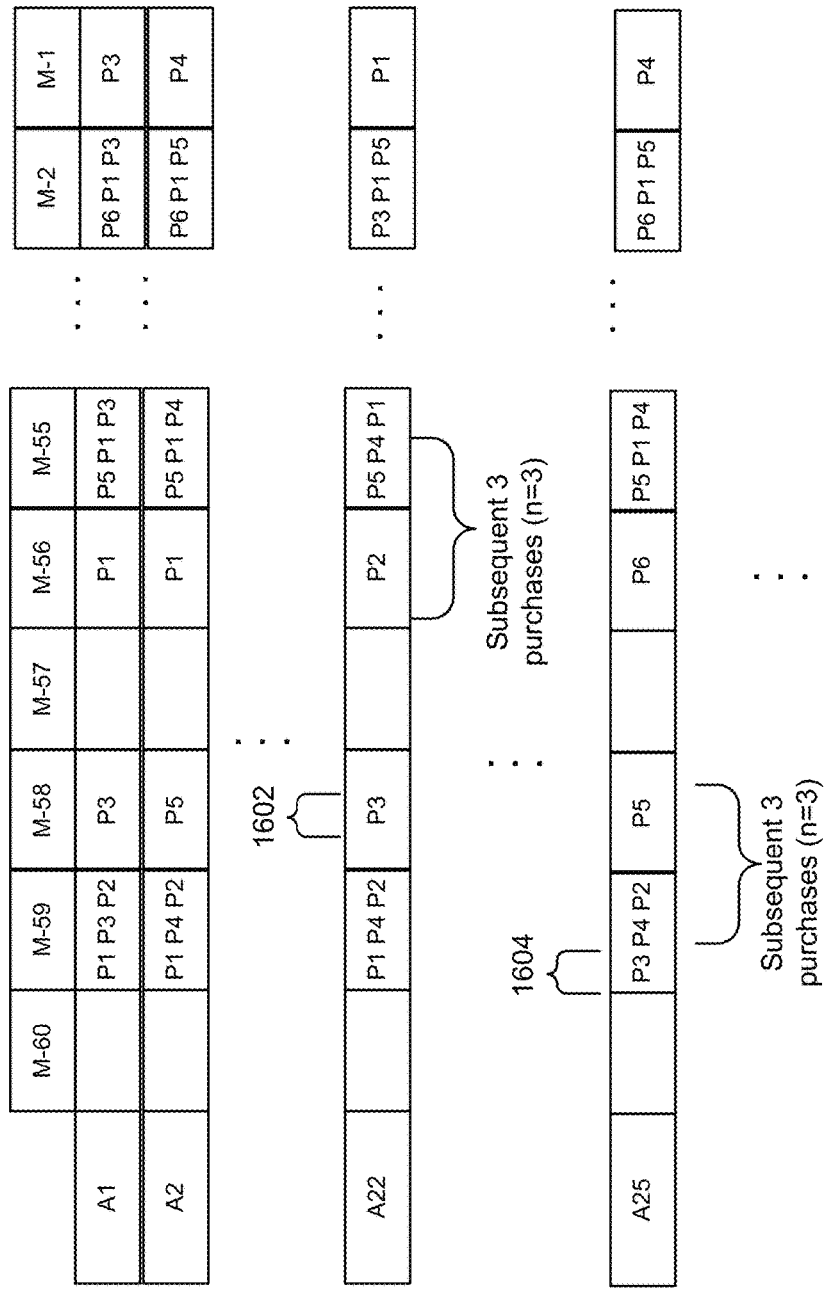
FIG. 16 is a table showing product purchases made by a plurality of entities over a predetermined historical period of time.

FIG. 16 is a table 1600 showing product purchases made by a plurality of entities over a predetermined historical period of time (e.g., 60 months in this example). Assuming the target entity is entity A1, the MRP is P3. Accordingly, certain embodiments make predictions for the next sequence of "n" products that entity A1 is likely to make after A1's purchase of P3 in month M-1. In the example shown in FIG. 16, P3 is found at 1602 of the account of entity A22 at month index M-58. If a sequence of 3 product is to be predicted for entity A1, then n=3 and the subsequent three purchases after P3 by entity A22 are obtained. For entity A22, the subsequent sequence of three purchased product is P1 (at position 1 of the sequence), P5 (at position 2 of the sequence), and P4 (at position 3 of the sequence). Certain embodiments use the month index −58, the similarity score CS1,22, the entity profile weight of entity A22, and position of the purchased product in the n=3 sequence to calculate a PRS for each product P1, P5, and P4.

In the example shown in FIG. 16, P3 is also found at 1604 of the account for entity A25 at month index M-59. For entity A25, the subsequent sequence of three purchased product is P2 (at position 1 of the sequence), P5 (at position 2 of the sequence), and P4 (at position 3 of the sequence). Certain embodiments use the month index −59, the similarity score CS1,25, entity profile weight of A25, and position of the purchased product in the n=3 sequence to calculate a PRS for each product P2, P5, and P4.

In certain embodiments, once product recommendation scores have been calculated for accounts in which the MRP has been found, the product recommendation scores are used to predict the next "n" sequence of products that entity A1 is likely to purchase. At least one embodiment sorts the product recommendation scores from high to low so that the "n" products having the highest product recommendation score are used to predict purchases by entity A1.

The operations described herein may also be extended to predict likely product purchase sequences for other accounts in the set of entities. The "n" product sequences for an entity may be calculated by making the entity the target entity and executing operations consistent with the teachings of the present disclosure.

Greenfield entities may be identified during neural network analyses of the map images while determining locality profile scores for a locality. As used herein, greenfield entities are entities that do not have an established purchasing relationship with the enterprise. In certain embodiments, an attempt to predict "n" product sequences for greenfield entities may be made using "n" product sequences for entities having an established purchasing relationship with the enterprise. In certain embodiments, firmographics information for the greenfield entities may be obtained from a third-party source, such as Google Business, Hoovers, etc., or from existing information held by the enterprise. In certain embodiments, a sequence of products likely to be purchased by the greenfield entities may be determined using the product sequences generated for one or more existing entities having similar firmographics as the greenfield entities.

Embodiments of the disclosure are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

What is claimed is:

1. A computer-implemented method for using machine vision to categorize a locality to conduct product positioning analyses, the method comprising:

training a neural network to extract regions of segmented pixel areas of a map image to provide a trained neural network, the neural network comprising a first convolutional neural network and a second convolutional network, the training comprising classifying entities from a plurality of entities based upon at least one of text and icons represented within the segmented pixel areas, the classifying entities classifying entities into a first type and a second type, the first convolutional neural network being trained using entities of the first type and the second convolutional neural network being trained using entities of the second type, the training the neural network enabling deep learning machine vision analysis on geographic artefacts found in the map image;

generating locality profile scores for each locality of a plurality of localities, wherein the locality profile score includes distributions of entity classes within the locality, the locality profile score for each locality being derived through neural network analyses of map images of the locality, the neural network analysis using the trained neural network;

extracting a set of entities having the same entity class from a group of localities, the set of entities being extracted using the trained neural network;

retrieving historical purchasing data for the set of entities for products purchased over a predetermined period of time;

determining similarity of purchasing characteristics for a target entity in the set of entities with respect to other entities in the set of entities;

generating a sequence of products likely to be purchased by the target entity as a function of:
　similarity of purchasing characteristics of the target entity with respect to other entities in the set of entities,
　product sequences found in product purchase histories in the historical purchasing data of other entities in the set of entities, and
　entity profile weights extracted from the locality profile scores of other entities in the set of entities that have purchased one or more of the same products as the target entity;

assigning purchases of products within the predetermined period of time to respective sub-periods of time for each entity in the set of entities, wherein the sub-periods of time are equally divided into sub-periods of length M, where M-x corresponds to a sub-period of time having a distance index −x from an endpoint of the predetermined period of time; and, for each entity in the set of entities, predicting a subsequent number "n" of products that will likely be purchased by the entity using operations including:
　identifying a most recent product (MRP) purchased by the target entity within the predetermined period of time;
　searching for purchases of the MRP by other entities in the historical purchasing data;
　if a purchase of the MRP is found for another entity, identifying a position M-x of the sub-period of time in which the product was purchased, and
　　identifying an "n" sequence of products purchased by the other entity; and generating a product recommendation score for each product of the "n" product sequence for the other entity, wherein the product recommendation score is a function of the similarity of product purchasing characteristics of the target entity and other entity, an entity profile weight of the other entity, and the position of the product in the "n" product sequence purchased by the other entity.

2. The computer-implemented method of claim 1, wherein identifying entities having similar product purchasing patterns comprises:
   determining a standardized monthly revenue for each type of product purchased by each entity in the set of entities over the predetermined period of time; and
   comparing the standardized revenue of products purchased by a target entity over the predetermined period of time with the standardized revenue of products purchased by other entities in the set of entities to calculate similarity scores indicative of similarities of purchasing characteristics of the target entity with respect to other entities in the set of entities.

3. The computer-implemented method of claim 2, wherein
   the standardized monthly revenue for a type of a product purchased by an entity in the set of entities includes determining a proportion of spending on the product with respect to spending by the entity on other types of products purchased by the entity during the predetermined period of time; and
   the similarity scores are calculated using a cosine similarity operation.

4. The computer-implemented method of claim 1, further comprising:
   generating product recommendation scores for the products of the "n" product sequences; and
   using the highest "n" product recommendation scores to identify the "n" product sequence of products likely to be purchased by the target entity.

5. The computer-implemented method of claim 1, further comprising:
   identifying greenfield entities through neural network analyses of the map images of localities in the group of localities;
   obtaining firmographics information for the greenfield entities; and
   generating a sequence of products likely to be purchased by the greenfield entities using the product sequences generated for one or more entities in the set of entities having similar firmographics as the greenfield entities.

6. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
      training a neural network to extract regions of segmented pixel areas of a map image to provide a trained neural network, the neural network comprising a first convolutional neural network and a second convolutional network, the training comprising classifying entities from a plurality of entities based upon at least one of text and icons represented within the segmented pixel areas, the classifying entities classifying entities into a first type and a second type, the first convolutional neural network being trained using entities of the first type and the second convolutional neural network being trained using entities of the second type, the training the neural network enabling deep learning machine vision analysis on geographic artefacts found in the map image;
      generating locality profile scores for each locality of a plurality of localities, wherein the locality profile score includes distributions of entity classes within the locality, the locality profile score for each locality being derived through neural network analyses of map images of the locality, the neural network analysis using the trained neural network;
      extracting a set of entities having the same entity class from a group of localities, the set of entities being extracted using the trained neural network;
      retrieving historical purchasing data for the set of entities for products purchased over a predetermined period of time;
      determining similarity of purchasing characteristics for a target entity in the set of entities with respect to other entities in the set of entities;
      generating a sequence of products likely to be purchased by the target entity as a function of:
         similarity of purchasing characteristics of the target entity with respect to other entities in the set of entities,
         product sequences found in product purchase histories in the historical purchasing data of other entities in the set of entities, and
         entity profile weights extracted from the locality profile scores of other entities in the set of entities that have purchased one or more of the same products as the target entity;
      assigning purchases of products within the predetermined period of time to respective sub-periods of time for each entity in the set of entities, wherein the sub-periods of time are equally divided into sub-periods of length M, where M-x corresponds to a sub-period of time having a distance index −x from an endpoint of the predetermined period of time; and,
      for each entity in the set of entities, predicting a subsequent number "n" of products that will likely be purchased by the entity using operations including:
         identifying a most recent product (MRP) purchased by the target entity within the predetermined period of time;
         searching for purchases of the MRP by other entities in the historical purchasing data;
         if a purchase of the MRP is found for another entity, identifying a position M-x of the sub-period of time in which the product was purchased, and identifying an "n" sequence of products purchased by the other entity; and
         generating a product recommendation score for each product of the "n" product sequence for the other entity, wherein the product recommendation score is a function of the similarity of product purchasing characteristics of the target entity and other entity, an entity profile weight of the other entity, and the position of the product in the "n" product sequence purchased by the other entity.

7. The system of claim 6, wherein identifying entities having similar product purchasing characteristics comprises:
   determining a standardized monthly revenue for each type of product purchased by each entity in the set of entities over the predetermined period of time; and
   comparing the standardized revenue of products purchased by a target entity over the predetermined period of time with the standardized revenue of products purchased by other entities in the set of entities to calculate similarity scores indicative of similarities of purchasing characteristics of the target entity with respect to other entities in the set of entities.

8. The system of claim 7, wherein
   the standardized monthly revenue for a type of a product purchased by an entity in the set of entities includes determining a proportion of spending on the product with respect to spending by the entity on other types of products purchased by the entity during the predetermined period of time; and
   similarity scores are calculated using a cosine similarity operation.

9. The system of claim 6, further comprising:
   generating product recommendation scores for the products of the "n" product sequences; and
   using the highest "n" product recommendation scores to identify the "n" product sequence of products likely to be purchased by the target entity.

10. The system of claim 6, further comprising:
    identifying greenfield entities through neural network analyses of the map images of localities in the group of localities;
    obtaining firmographics information for the greenfield entities; and
    generating a sequence of products likely to be purchased by the greenfield entities using the product sequences generated for one or more entities in the set of entities having similar firmographics as the greenfield entities.

11. A non-transitory, computer-readable storage medium embodying computer program code, the computer program code comprising computer executable instructions configured for:
    training a neural network to extract regions of segmented pixel areas of a map image to provide a trained neural network, the neural network comprising a first convolutional neural network and a second convolutional network, the training comprising classifying entities from a plurality of entities based upon at least one of text and icons represented within the segmented pixel areas, the classifying entities classifying entities into a first type and a second type, the first convolutional neural network being trained using entities of the first type and the second convolutional neural network being trained using entities of the second type, the training the neural network enabling deep learning machine vision analysis on geographic artefacts found in the map image;
    generating locality profile scores for each locality of a plurality of localities, wherein the locality profile score includes distributions of entity classes within the locality, the locality profile score for each locality being derived through neural network analyses of map images of the locality, the neural network analysis using the trained neural network;
    extracting a set of entities having the same entity class from a group of localities, the set of entities being extracted using the trained neural network;
    retrieving historical purchasing data for the set of entities for products purchased over a predetermined period of time;
    determining similarity of purchasing characteristics for a target entity in the set of entities with respect to other entities in the set of entities; and
    generating a sequence of products likely to be purchased by the target entity as a function of:
       similarity of purchasing characteristics of the target entity with respect to other entities in the set of entities,
       product sequences found in product purchase histories in the historical purchasing data of other entities in the set of entities, and
       entity profile weights extracted from the locality profile scores of other entities in the set of entities that have purchased one or more of the same products as the target entity;
    assigning purchases of products within the predetermined period of time to respective sub-periods of time for each entity in the set of entities, wherein the sub-periods of time are equally divided into sub-periods of length M, where M-x corresponds to a sub-period of time having a distance index −x from an endpoint of the predetermined period of time; and,
    for each entity in the set of entities, predicting a subsequent number "n" of products that will likely be purchased by the entity using operations including:
       identifying a most recent product (MRP) purchased by the target entity within the predetermined period of time;
       searching for purchases of the MRP by other entities in the historical purchasing data;
       if a purchase of the MRP is found for another entity, identifying a position M-x of the sub-period of time in which the product was purchased, and identifying an "n" sequence of products purchased by the other entity; and
       generating a product recommendation score for each product of the "n" product sequence for the other entity, wherein the product recommendation score is a function of the similarity of product purchasing characteristics of the target entity and other entity, an entity profile weight of the other entity, and the position of the product in the "n" product sequence purchased by the other entity.

12. The non-transitory, computer-readable storage medium of claim 11, wherein
    identifying entities having similar product purchasing characteristics comprises:
    determining a standardized monthly revenue for each type of product purchased by each entity in the set of entities over the predetermined period of time; and
    comparing the standardized revenue of products purchased by a target entity over the predetermined period of time with the standardized revenue of products purchased by other entities in the set of entities to calculate similarity scores indicative of similarities of purchasing characteristics of the target entity with respect to other entities in the set of entities.

13. The non-transitory, computer-readable storage medium of claim 12, wherein
    the standardized monthly revenue for a type of a product purchased by an entity in the set of entities includes determining a proportion of spending on the product with respect to spending by the entity on other types of products purchased by the entity during the predetermined period of time; and the similarity scores are calculated using a cosine similarity operation.

14. The non-transitory, computer-readable storage medium of claim 11, further comprising:

generating product recommendation scores for the products of the "n" product sequences; and using the highest "n" product recommendation scores to identify the "n" product sequence of products likely to be purchased by the target entity.

\* \* \* \* \*